United States Patent [19]

Young

[11] Patent Number: 5,564,023
[45] Date of Patent: Oct. 8, 1996

[54] METHOD FOR ACCESSING A SEQUENCER CONTROL BLOCK BY A HOST ADAPTER INTEGRATED CIRCUIT

[75] Inventor: B. Arlen Young, Palo Alto, Calif.

[73] Assignee: Adaptec, Inc., Milpitas, Calif.

[21] Appl. No.: 269,463

[22] Filed: Jun. 30, 1994

[51] Int. Cl.⁶ ................................................. G06F 13/00
[52] U.S. Cl. .......................... 395/280; 395/412; 395/417; 395/419
[58] Field of Search ................................. 395/325, 280, 395/412, 417, 419

[56] References Cited

U.S. PATENT DOCUMENTS

| | | | |
|---|---|---|---|
| 3,786,432 | 1/1974 | Woods | 340/172.5 |
| 3,800,287 | 3/1974 | Albright | 340/172.5 |
| 4,509,113 | 4/1985 | Heath | 364/200 |
| 4,598,384 | 7/1986 | Shaw et al. | 364/900 |
| 4,779,190 | 10/1988 | O'Dell et al. | 364/200 |
| 4,975,829 | 12/1990 | Clarey et al. | 364/200 |
| 5,131,081 | 7/1992 | MacKenna et al. | 395/275 |
| 5,142,635 | 8/1992 | Saini | 395/375 |
| 5,193,161 | 3/1993 | Bealkowski et al. | 395/400 |
| 5,210,749 | 5/1993 | Firoozmand | 370/85.1 |
| 5,239,636 | 8/1993 | Dujari et al. | 395/425 |
| 5,257,368 | 10/1993 | Benson et al. | 395/600 |
| 5,287,481 | 2/1994 | Lin | 395/425 |
| 5,297,067 | 3/1994 | Blackborow et al. | 364/708.1 |
| 5,404,471 | 4/1995 | Kawano et al. | 395/375 |
| 5,485,584 | 1/1996 | Hausman et al. | 395/842 |

Primary Examiner—Jack B. Harvey
Assistant Examiner—John Travis
Attorney, Agent, or Firm—Skjerven, Morrill, MacPherson, Franklin & Friel; Forrest E. Gunnison

[57] ABSTRACT

A busy targets table is created in a memory that can be either internal or external to a SCSI host adapter. Each entry in the table initially is set to a predetermined value. Prior to starting execution of each hardware request block, the host adapter performs a check to determine whether the hardware request block can be executed at this time by generating an offset into the busy targets table using a target address in the hardware request block. The host adapter then checks the entry in the busy targets table at the location of the offset. If the entry in the busy targets table at the location of the offset is the predetermined value, the device at the target address, i.e., the target, is available. Therefore, the execution of the hardware request block can proceed and so the host adapter overwrites the predetermined value at the offset in the table with a pointer to a storage location of said SCSI hardware request block and continues executing the hardware request block. If the target disconnects from the host adapter, the busy targets table is used to locate the appropriate hardware request block when the target reconnects to the host adapter. Specifically, the host adapter generates an offset into the busy targets table using target address information provided by the target. The host adapter uses the offset to locate the pointer stored in the busy targets table and then locates the appropriate hardware request block using the pointer.

22 Claims, 8 Drawing Sheets

Microfiche Appendix Included
(532 Microfiche, 7 Pages)

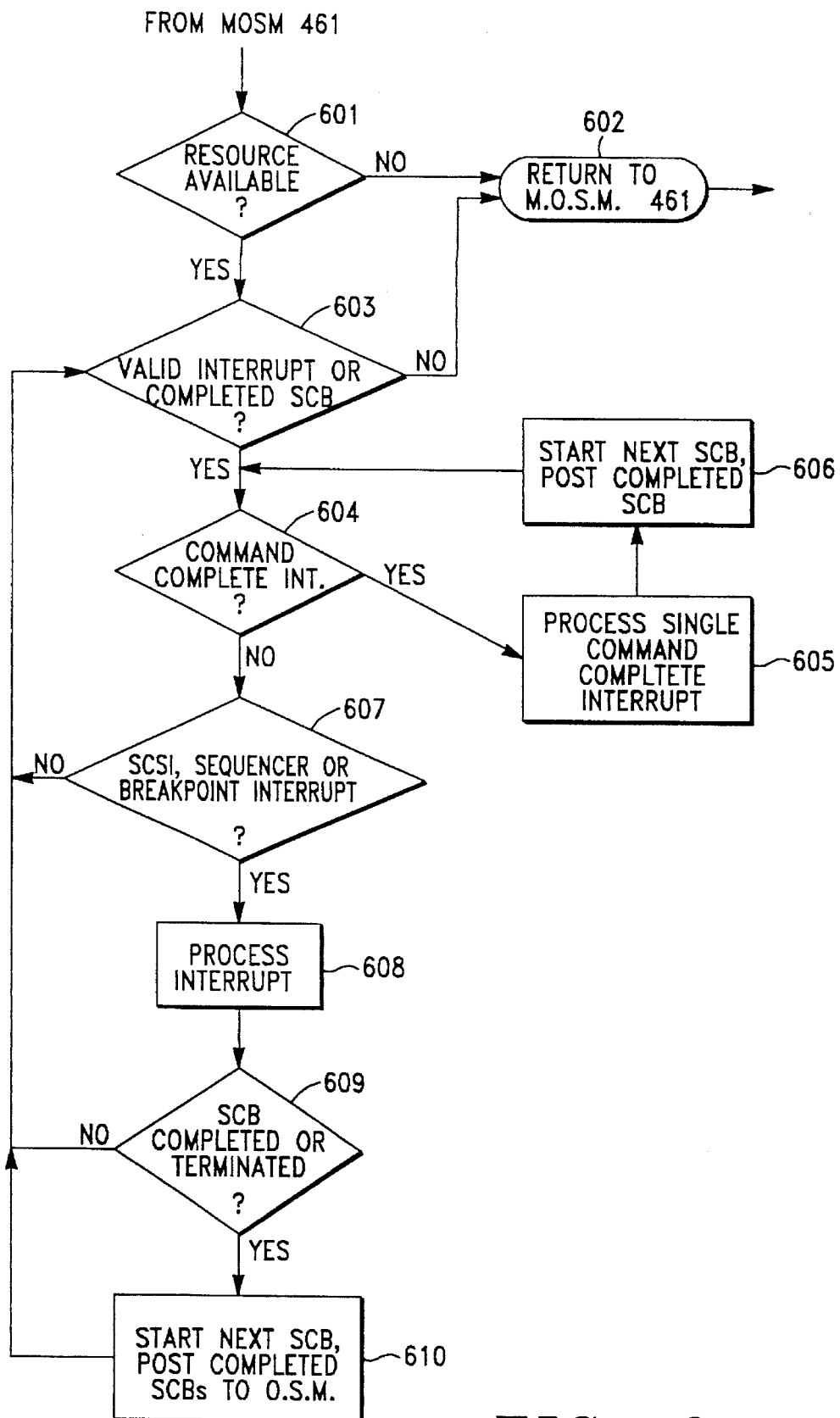
FIG.−6

METHOD FOR ACCESSING A SEQUENCER CONTROL BLOCK BY A HOST ADAPTER INTEGRATED CIRCUIT

REFERENCE TO MICROFICHE APPENDIX

Appendix A, which is a part of the present disclosure, is a microfiche appendix consisting of 5 sheets of microfiche having a total of 461 frames. Microfiche Appendix A is a listing of computer programs and related data including a host adapter driver for use with one embodiment of this invention, which is described more completely below, and is incorporated herein by reference in its entirety.

Appendix B, which is a part of the present disclosure, is a microfiche appendix consisting of 2 sheets of microfiche having a total of 71 frames. Microfiche Appendix B is a listing of sequencer firmware for use with one embodiment of this invention, which is described more completely below, and is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is related generally to host-adapter systems for information sharing between intelligent devices connected to a common data exchange bus such as a local area network (LAN) and more specifically to a method for rapidly accessing hardware request blocks stored in a memory either external or internal to a host adapter integrated circuit.

2. Description of Related Art

The Small Computer System Interface (SCSI) standard, which is specified by the American National Standards Institute (ANSI X3.131-1986, which is incorporated herein by reference in its entirety) of 1430 Broadway, New York, N.Y. 10018, is an example of an industry-recognized standard for a relatively complex local area network. Descriptions of the SCSI bus may be found for example in U.S. Pat. No. 4,864,291 "SCSI Converter" issued Sep. 5, 1989 to J. E. Korpi and in U.S. Pat. No. 4,905,184 "Address Control System for Segmented Buffer Memory" issued Feb. 27, 1990, to R. P. Giridhar, et al., which are incorporated herein by reference in their entirety.

A typical SCSI system 100 is illustrated in FIG. 1. A plurality of intelligent devices 120, 140, 141, 142 are coupled to SCSI bus 110 so that these devices can exchange information. The intelligent devices are (i) a first host system 120, whose internal structure is shown in detail, (ii) a second host system 140, whose internal structure is similar to that shown for system 120, (iii) a first disk drive unit (Target-A) 141, and (iv) a second disk drive unit (Target-B) 142.

Communications over SCSI bus 110 begin when one of devices 120, 140 initiates a data transfer. A typical data transfer operation has seven SCSI "phases": (1) ARBITRATE, (2) SELECT, (3) MESSAGE (out), (4) COMMAND, (5) DATA, (6) STATUS and (7) MESSAGE (in).

The operation of the SCSI phases for data transfer is well-known to those skilled in the art. Briefly, during the ARBITRATE phase, competing host systems 120 and 140 decide which system gains exclusive control of SCSI bus 110. During the SELECT phase, the winning host designates one of the other devices as a "target". After selection of the target, a command is issued from the host to specify the details of the data transfer, such as direction, length, and address of the data in the target. Data is transferred over the SCSI bus 110 either synchronously or asynchronously in blocks of, for example, 512 bytes each at a speed up to 20 megabytes (Mbytes) per second.

The host and target exchange handshakes for each byte of data transferred over the SCSI bus. When the target anticipates a time delay in the data stream, the chosen target disconnects (in the logic sense) from SCSI bus 110, and the winning host relinquishes control over SCSI bus 110. This leaves SCSI bus 110 in a Bus-Free state, permitting other SCSI transfer operations to take place over bus 110. The data transfer operations can be either single-threaded (one host-target pair is active at a time) or multi-threaded (one host initiates transfers with many targets concurrently).

While the advantages of SCSI are widely recognized, the implementation of the SCSI protocol can limit the performance of a SCSI bus. For example, if a SCSI host adapter is implemented in a single integrated circuit with an on-board memory for storing control blocks that define operations that are to be performed by the SCSI host adapter, the size of the on-board memory may limit the operation of the SCSI host adapter. For example, consider a SCSI host adapter integrated circuit, such as that disclosed in copending and commonly assigned U.S. patent application Ser. No. 07/964,532 entitled "Intelligent SCSI Bus Host Adapter Integrated Circuit," of Craig A. Stuber et al. filed on Oct. 16, 1992, which is incorporated wherein by reference in its entirety.

FIG. 2 is a block diagram of a host adapter integrated circuit 7770 that includes a SCSI module 230 for interfacing with a SCSI bus, a host interface module 210 for interfacing with a computer bus 226, a data first-in-first out memory circuit 260, a memory 240 and a sequencer 220. Memory 240 includes a sequencer memory 241, a scratch random access memory (RAM) 242, and a sequencer control block (SCB) memory 243. A detailed description of each of the modules and circuits in host adapter integrated circuit 7770 is given in co-pending and commonly assigned U.S. patent application Ser. No. 07/964,532 cited above and that description of each module and circuit is incorporated herein by reference. (FIG. 2 herein is the same as FIG. 4 in U.S. patent application Ser. No. 07/964,532, but the reference numerals have been changed for convenience.)

Briefly, sequencer 220 includes sequencer RAM 241 in memory 240, a RISC processor 222, and a sequencer register set 221. Scratch RAM area 242 in memory 240 is available for temporary storage of state information, e.g., in one embodiment a sequencer stack is maintained in scratch RAM 242.

Host adapter 7770 is controlled by a software driver 203, which includes an operating system specific module (OSM) 204 and a hardware interface module (HIM) 205 in main memory 227 of host computer system 200. OSM 204 knows nothing about the hardware in host adapter 7770 and communicates with both computer operating system 202 and HIM 205. HIM 205 communicates only with host adapter 7770 and OSM 204. OSM 204 builds a SCB and sends the SCB to HIM 205.

HIM 205 adds the SCB to a queue of SCBs maintained by HIM 205, and then HIM 205 checks for an available SCB slot in SCB array 243 onboard host adapter 7770. HIM 205 tracks four SCB slots "0" to "3" in SCB array 243 to determine the number of unused SCB slots. If a SCB slot is available, i.e. free, HIM 205 sets a bit PAUSE in a register HCNTRL in registers 211 thereby pausing sequencer 220. This prevents sequencer 220 and HIM 205 from colliding on a CIOBUS 250, thereby preventing a CIOBUS contention. HIM 205 loads an available SCB in SCB array 243 by transferring nineteen bytes into the available slot in SCB array 243 using a PIO data transfer, updates registers 211, in particular, places the page number, i.e. SCB slot, in queue-in FIFO 212 onboard host adapter 7770, and then unpauses sequencer 220.

Conversely, if a SCB slot is not available in SCB array 243, as indicated by the value of a register QINCNT in registers 211, the SCB remains queued in memory 227. When a SCB slot becomes available in SCB array 243, HIM 205 sends the oldest SCB in memory 227 to SCB array 243, as described above.

Each SCB in SCB array 243 includes a pointer to the SCSI command, a SCSI command length count, a pointer to a scatter/gather data transfer pointer list, a count of the number of elements in the scatter/gather list, the status returned by the target as well as temporary holding location and other statuses. Some of the values in the SCB are provided subsequently by HIM 205 or sequencer 220.

With the queued commands in SCB array 243, more than one target device may have commands open but disconnected. The four SCB slots are for general purpose SCBs and the SCBs in the four SCB slots may be used in any combination on either SCSI channel in SCSI module 230. To preserve the order of execution for any target/logic-unit-number (LUN) combination, the restriction is made that no more than two SCBs with the same target/channel/LUN identification can be loaded in SCB array 243. This restriction does not apply to tagged commands.

When sequencer 220 is not executing a SCSI command, sequencer 220 is in an idle loop and periodically scans the value of register QINCNT onboard host adapter 7770 to determine whether a new SCB has been loaded in SCB array 243. When a queued SCB is detected by reading register QINCNT, sequencer 220 loads SCB pointer register SCBPTR in registers 211 with the page number at the top of queue-in FIFO 212, which in turn decrements register QINCNT.

Since the address for every SCB is loaded into register SCBPTR and subsequently into the sequencer address circuitry, sequencer 220 must only specify an offset to obtain information from or write information to the active SCB.

The new SCB contains pointers to the SCSI command to be completed as well as the locations in host memory 227 to read or write data. Sequencer 220 attempts to execute the new SCB if it does not conflict with an already open SCB, i.e., the target/channel/LUN in the new SCB matches the target/channel/LUN in the SCB for an open command. Conversely, if the new SCB does conflict with an open command, the pointer for the SCB in register SCBPTR is written back to queue-in FIFO 212 and register QINCNT incremented.

Once a command is started, the target may disconnect. If a target does disconnect, sequencer 220 saves data pointers in the SCB for the command and marks the SCB as disconnected. In this case, sequencer 220 enters the idle loop and looks for the next SCB to execute. Notice that this is all done without the assistance of HIM driver 205 and all the necessary information is stored within host adapter 7770.

When reselection occurs, a search for a disconnected SCB with the same target/channel/LUN is made and when found, the disconnected SCB is continued. If two reselections, one on each channel, happen at the same time, a fairness algorithm is used to prevent one channel from being locked out.

In the case of tagged commands, the number of SCBs to the same target/channel/LUN may equal the space in SCB array 243. The commands are sent with the tag value generated by sequencer 220. Upon reselection, sequencer 220 matches target/channel/LUN/tag before completing the command.

When sequencer 220 is finished with the command, sequencer 220 moves the SCB pointer from register SCBPTR to queue-out FIFO 213 generates a hardware interrupt to microprocessor 225. Writing to register queue-out FIFO 213 increments the value in register QOUTCNT. Sequencer 220 then continues to execute any other SCBs that have been loaded.

In response to the hardware interrupt, host microprocessor 225 transfers control to OSM 204 which in turn calls the interrupt handler in HIM 205. HIM 205 queries interrupt status register INTSTAT in registers 211 to determine the cause of the hardware interrupt. HIM 205 notes that the SCSI command was completed and then queries queue-out FIFO 213 to determine which SCB was completed. HIM 205 transfers that information to OSM 204 which in turn notifies user application 201 and issues an end of interrupt signal EOI to microprocessor 225. OSM 204 then directs HIM to release the completed SCB. HIM 205 can read register queue-out FIFO 213 and register QOUTCNT until queue-out FIFO 213 is empty without pausing sequencer 220. Thus, HIM 205 can service commands that have completed without error without pausing sequencer 220. A SCB that completes normally does not need any status information copied back to the SCB in memory, and the next SCB can be copied directly on top of it.

Queuing the SCBs, and hence the SCSI commands, allows sequencer 220 to execute or suspend execution of a command at any point in the command sequence by updating the SCB to indicate the current completion status of the command.

Three parameters control SCB queuing by HIM 205:

| | |
|---|---|
| 1) max_nontag_cmd = | maximum number of active non-tagged SCBs per target ID. (Default is 2, other allowable value is 1.) |
| 2) max_tag_cmd = | maximum number of active tagged SCBs per target ID. (Default is 2, can range from 1 to 4.) |
| 3) max_total_cmd = | maximum number of total SCBs outstanding in sequencer 220. (Default and maximum is 4) |

Sequencer 220 executes SCBs in the order that they are received in queue-in FIFO 212. If a non-tagged SCB is received for a target that is already active, sequencer 220 returns the SCB to queue-in FIFO 212. When a target disconnects, or a selection is in process, sequencer 220 scans queue-in FIFO 212 and other SCBs for any event that merits attention.

When an exception completion condition, e.g., selection timeout, parity error, occurs, sequencer 220 is paused due to either a SCSI or sequencer interrupt. For sequencer interrupts, the current SCB pointer determines which SCB caused the exception. For SCSI interrupts, HIM 205 may have to check all four internal SCBs in SCB array 243 to locate the source of the exception. If status, transfer information, etc. are needed, they can be copied from the internal SCB corresponding to the interrupt.

During the course of executing a SCB, there are three situations when SCBs in SCB array 243 must be located: i) prior to the execution of the SCB, to determine that the SCSI target is available to receive a new command; ii) after selection of the SCSI target is completed; and iii) after reconnection by the target.

In each of the three situations, SCB array 243 is searched to locate a SCB with a particular attribute, i.e., a) a target/LUN equal to the target/LUN in the SCB which is a candidate for starting; b) a SCB status of 'waiting'; and c) a SCB status of 'disconnected' and a target/LUN which is equal to the reconnecting target/LUN, respectively.

An SCB having one of these prescribed attributes is located by scanning SCB array 243 and examining each SCB in sequence. A serial scan is started at the top of array 243, and continues until either the objective SCB is found or the end of the array is reached. Two SCB attribute flag bits, 'swait' and 'sdiscon' are objects of SCB searches. Bit 'swait' identifies a SCB as one waiting for a target selection to complete. Bit 'Sdiscon' identifies a SCB as one for which the target has disconnected and not yet reconnected.

Since the maximum number of non-tagged queue SCBs resident in SCB array 243 at any given time for the same target/LUN is two, sequencer 220 does not start execution of a second SCB until the execution of the first SCB has completed to avoid receiving a 'busy' error status from the target. Hence, before beginning execution of a SCB, sequencer 220 searches the SCB array 243 for another SCB with the same target/LUN and the bit 'sdiscon' set. If such a SCB is found, commencement of SCB execution is postponed.

While selecting a target, sequencer 220 is in an "idle" loop or is responding to a reconnection. When selection is completed, sequencer 220 locates and retrieves the corresponding SCB. It does this by searching SCB array 243 for a SCB with the 'swaiting' flag set.

Following reselection, when a target reconnects, the target provides sequencer 220 with its target and LUN addresses. Sequencer 220 searches SCB array 243 for a SCB with this target/LUN combination and bit 'sdiscon' set. Since there is no ordering of SCBs in SCB array 243, the reconnecting SCB could be anywhere within SCB array 243. Again, sequencer 220 searches the entire SCB array 243, examining every SCB to retrieve the SCB for the reconnecting target.

Although serial scanning of the four active SCBs in internal SCB array 243 does not take an appreciable amount of time, the availability of only four active SCBs causes I/O bottlenecks in several situations. In addition, if the number of onboard active SCBs is increased, the serial scanning in the three situations outlined above as well as for SCSI interrupts may limit the performance of the host adapter integrated circuit. For operation in high capacity I/O environments, high speed operation coupled with a large number of active SCBs is required. In view of the limited number of onboard SCB slots and the serial scanning, host adapter integrated circuit 7770 and similar integrated circuit perform poorly in such an environment.

SUMMARY OF THE INVENTION

In accordance with the principles of this invention, the performance of a host adapter integrated circuit, hereinafter host adapter, is enhanced by a novel method for accessing stored blocks of information containing SCSI I/O target commands, i.e, hardware request blocks. This method eliminates the need for serially scanning the stored hardware request blocks to find a particular block as well as the need for any type of searching. According to the principles of this invention, the target address specified in the hardware request block is used to define a unique storage location for a pointer to the hardware request block. Consequently, when the hardware request block is needed, the target address is used to directly locate the pointer to the hardware request block thereby eliminating the need for any searching.

Initially, according to the principles of this invention, a table, sometimes called a busy targets table, is created in a memory that can be either internal or external to the host adapter. Each entry in the table is set to a predetermined value, which in one embodiment is the maximum size of a hardware request block address array. Hence, if a one byte pointer is used to locate entries in the hardware request block address array, the array can have a maximum of 256 entries and so the predetermined value is FFh.

In one embodiment, the size of the busy targets table is determined by the number of target and logical unit number (LUN) combinations, i.e, target addresses, that are of interest. For example, to support 16 targets having 8 LUNs per target, the busy targets table must have 128 elements. The size of each element is determined by the size of the pointers, as described below, that are stored in the busy targets table.

As each hardware request block is accessed for execution by the host adapter, the host adapter performs a check to determine whether the hardware request block can be executed at this time. Specifically, the host adapter generates an offset into the busy targets table using a target address in the hardware request block. The host adapter then checks the entry in the busy targets table at the location of the offset.

If the entry in the busy targets table at the location of the offset is the predetermined value, the device at the target address, i.e., the target, is available. Therefore, the execution of the hardware control request can proceed and so the host adapter overwrites the predetermined value at the offset in the table with a pointer to a storage location of the SCSI hardware request block and continues executing the hardware request block.

If the target disconnects from the host adapter, the hardware request block is written back to the hardware request block array. The busy targets table is used to locate the appropriate hardware request block when the target reconnects to the host adapter. Specifically, the host adapter generates an offset into the busy targets table using the target address information provided by the target.

The host adapter uses the offset to locate the pointer stored in the busy targets table and then locates the appropriate hardware request block in the hardware request block array using the pointer. Since no searching is required to locate the hardware request block for the reconnecting target, the operation of the host adapter is significantly enhanced over a host adapter that must search a hardware request block array to find the appropriate hardware request block.

As explained above, the target address includes target and LUN information. To generate the offset into the busy targets table, in one embodiment, the target and LUN information is rotated. In another embodiment, the target and LUN information is used directly. When the target and LUN information is in a hardware request block byte, the target and LUN information is rotated by rotating the hardware control block byte four places to the left.

DESCRIPTION OF THE DRAWINGS

FIG. 6 is a process flow diagram for an interrupt handler according to the principles of this invention.

Figure 1:
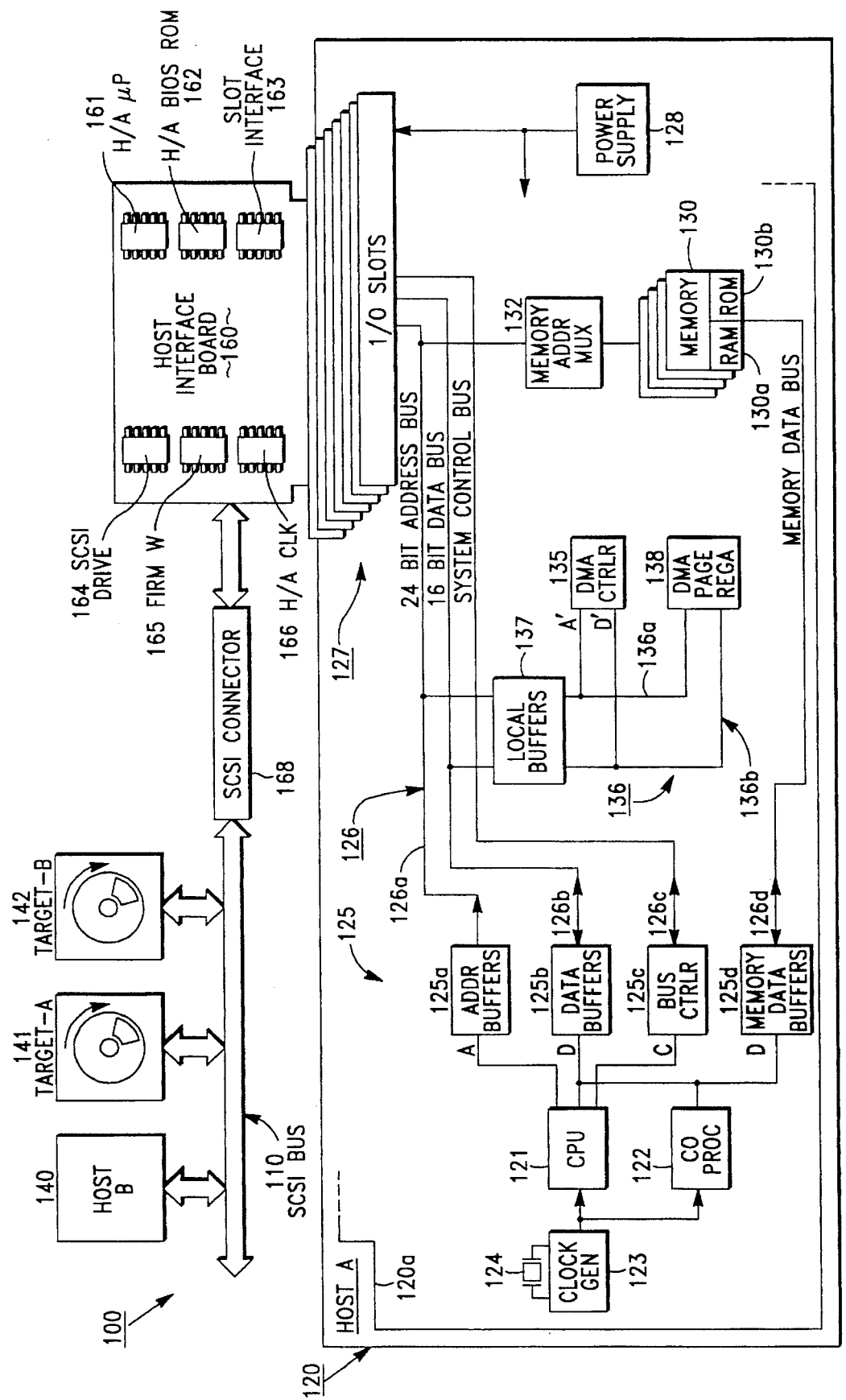
FIG. 1 is a block diagram of a prior art SCSI host adapter computer system that utilized a host adapter board.

In the drawings, the first number in a reference number indicates the drawing in which the element having that reference numeral first appeared. For example, all elements with a reference numeral that starts with three first appear in FIG. 3.

DETAILED DESCRIPTION

In accordance with the principles of this invention, the performance of a host adapter integrated circuit with a fixed number of onboard hardware registers that are used to store blocks of information for SCSI I/O target commands, i.e, hardware request blocks, is enhanced by using a structure external to the host adapter integrated circuit to store the blocks of information. Further, since the number of hardware request blocks that is stored in the external structure is typically significantly greater than the number of hardware request blocks that can be stored in the onboard registers, a high speed method for retrieving a particular hardware request block from the external structure is provided so that the hardware request block can be passed to and from the host adapter integrated circuit without delays associated with serially scanning through all of the hardware request blocks. In this embodiment, the high speed retrieval method is used with an external memory, as explained below. The high speed retrieval method can also be used when the hardware request blocks are stored in a memory onboard a host adapter.

According to the principles of this invention, a host adapter driver 303 (FIG. 3) in memory 327 of a host computer system 300 is an enhanced novel version of prior art host adapter driver 203. In response to a request for use of a device on SCSI bus 390 from user application 301, that is executing on host processor 325, operating system 302 passes the request to host adapter driver 303, which in turn builds a hardware request block.

Host adapter driver 303 loads the hardware request block into a hardware request block structure 372, sometimes called, a hardware request block array, in a memory 370 that is external to host adapter integrated circuit 377. In one embodiment, memory 370 is a part of main memory 327 of host computer 300. Host adapter driver 303 also loads the physical base address of the hardware request block into a hardware request block address array 375. Host adapter driver 303 writes the offset, i.e., the distance from the base of hardware request block address array 375 to the location within array 375 where the hardware request block physical base address was loaded, in a queue-in first-in-first out structure (FIFO) 376 in external memory 370. Sometimes the "offset" is referred to as a "pointer". Herein, queue-in FIFO 376 is effectively an array in external memory 370 that is operated as a FIFO memory.

External memory 370 is within the address space of host adapter integrated circuit 377, i.e., within an address space of a direct memory access (DMA) engine in host adapter integrated circuit 377, as well as within the address space of host processor 325. When sequencer 320 in host adapter integrated circuit 377 is ready to process a hardware request block, sequencer 320 (FIG. 3) reads the next pointer in queue-in FIFO 376 in external memory 370.

Sequencer 320 retrieves from hardware request block address array 375 the hardware request block physical base address stored at the location indicated by the pointer retrieved from queue-in FIFO 376. Using the retrieved physical address, host adapter integrated circuit 377 transfers a hardware request block 372A into onboard memory 340 of host adapter integrated circuit 377.

Host adapter integrated circuit 377 executes the command in hardware request block 372A. Herein, execution of a hardware request block means execution of the command in the hardware request block. If the target disconnects before completion of the command, the pointer for hardware request block 372A was written at an offset, that is determined using the target address of the disconnecting target, in a busy targets table 380. In this embodiment, the target address is defined by the target identification (ID) and the logical unit number (LUN), which is sometimes referred to as the target/LUN address. The hardware request block is also written back to the proper location in hardware request block array 372 prior to suspension of execution. Notice that in these operations, the hardware request block itself is written back and forth between external memory 370 and memory 340 onboard host adapter integrated circuit 377 if execution of the hardware request block is suspended.

When the target reconnects, sequencer 320 does not sequentially scan the hardware requests blocks in hardware request block structure 372 to locate the appropriate hardware request block. Rather, sequencer 320 uses the target address from the reconnecting target to generate an offset within busy targets table 380. The offset identifies the storage location within busy targets table 380 of the pointer to the hardware request block for the reconnecting target.

Using the offset, sequencer 320 retrieves the pointer from busy targets table 380 and then using the retrieved pointer, retrieves the physical base address from hardware request block address array 375 for hardware request block 372A within hardware request block structure 372. Sequencer 320 retrieves hardware request block 372A for the reconnecting target from hardware request block structure 372 using the retrieved physical base address. Thus, rather than a sequential search of all hardware request blocks in the array as in the prior art, the correct hardware request block is accessed directly without searching upon reconnection of a target. This high speed method of locating a particular hardware request block allows use of a large number of active hardware request blocks without degrading the performance of host computer system 300.

Upon completion of the command in hardware request block 372A, the pointer for hardware request block 372A is written to a queue-out FIFO 378 in memory 370 and a hardware interrupt to host processor 325 is generated. In response to the hardware interrupt, host adapter driver 303 is called to process the interrupt.

Host adapter driver 303 inspects queue-out FIFO 378 for a valid hardware request block pointer. Host adapter driver 303 removes each valid hardware request block pointer found and replaces each such pointer with an invalid pointer. Host adapter driver 303 also removes the address for the hardware request block from hardware request block address array 375.

While retrieving a hardware request block 372A from external memory 370 would be expected to degrade the performance of host adapter integrated circuit 377 in comparison to retrieving hardware request block 372A from a hardware register onboard host adapter integrated circuit 377, the ability to actually handle more active hardware request blocks than the number permitted by the onboard hardware results in an increase in performance of host adapter integrated circuit 377. Specifically, the I/O rate, in bytes per second, is greater for a host adapter integrated circuit 377 with external storage of the active hardware request blocks of this invention than for only the host adapter integrated circuit with onboard register storage for a limited number of hardware request blocks, e.g., four to sixteen hardware registers. Therefore, this invention enhances the operation of a prior art host adapter integrated circuit with limited onboard register capacity. In addition, as explained more completely below, in the present invention, the sequencer on the host adapter integrated must be paused only once for each hardware request block that is processed. This decrease in pauses for the sequencer enhances performance in comparison with the prior art host adapter that used only onboard hardware registers for storing active hardware request blocks.

Figure 4:
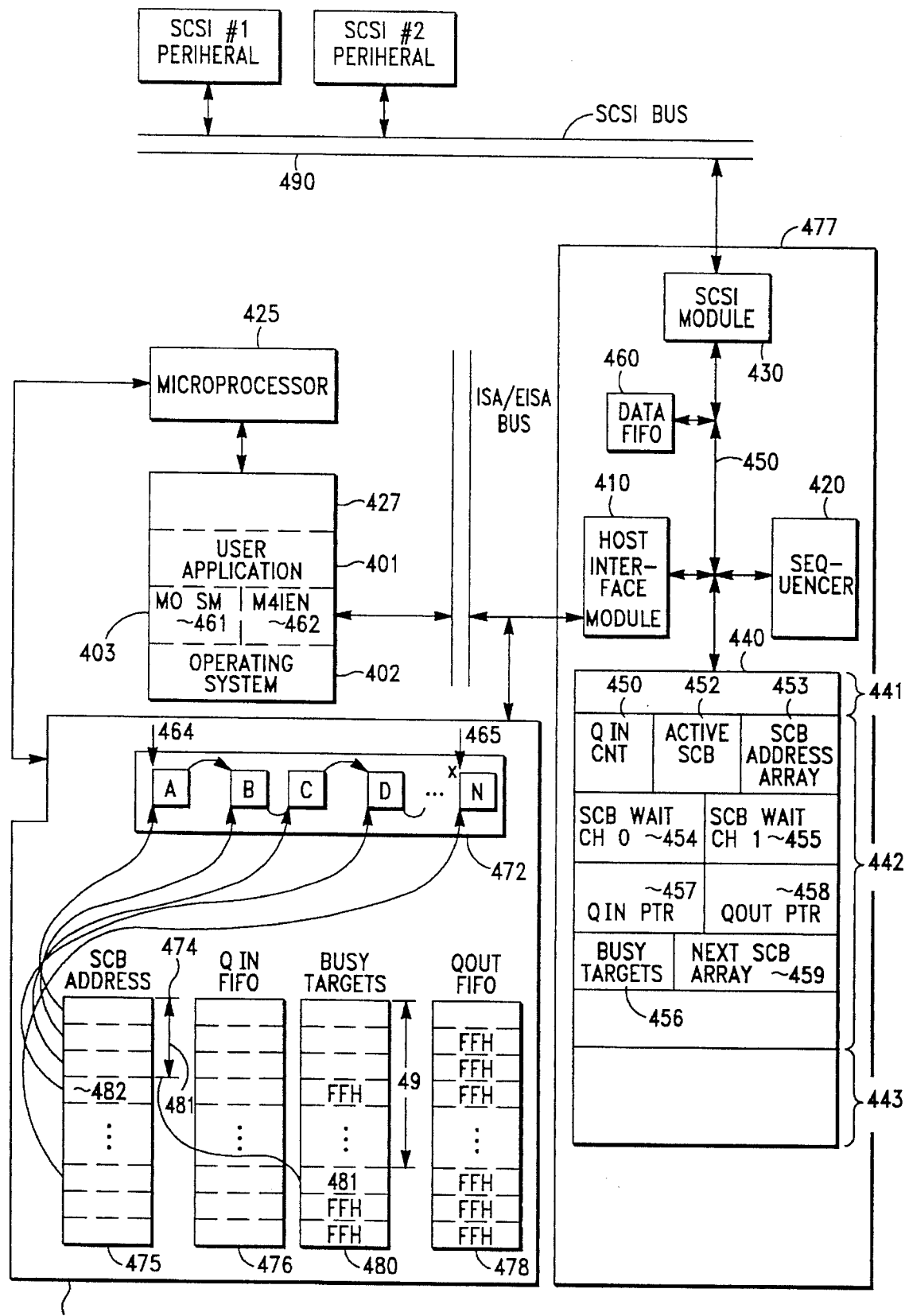
FIG. 4 is a diagram of one embodiment of the novel SCSI host adapter computer system of FIG. 3.

For one embodiment of this invention, host adapter integrated circuit 377 includes (i) a sequencer 420 (FIG. 4); (ii) sequencer memory 440 that contains sequencer firmware memory 441, a scratch RAM 442, and at least one hardware request block storage location 443; (iv) a host interface module 410; and (v) a SCSI interface module 430. Sequencer 420 initiates direct memory access (DMA) transfers between memory 470 external to host adapter integrated circuit 477 and at least one hardware request block storage location 443. The particular hardware onboard the host adapter integrated circuit is not an important aspect of this invention as in view of this disclosure, those skilled in the art will be able to implement the invention for a wide variety of host adapter architectures. Therefore, for convenience, prior art host adapter integrated circuit 7770, that is described in co-pending and commonly assigned U.S. patent application Ser. No. 07/964,532 cited above, is used to demonstrate the principles of this invention.

Thus, in this embodiment, dual channel SCSI module 230 is SCSI interface module 430, host interface module 210 is host interface module 410, sequencer 220 is sequencer 420 and so on. One embodiment of sequencer firmware for use with this invention is presented in Microfiche Appendix B, which is incorporated herein by reference.

Host adapter integrated circuit 477, sometimes simply referred to as host adapter 477, is controlled by a software driver 403, which includes a modified operating system specific module (MOSM) 461 and a modified hardware interface module (MHIM) 462. One embodiment of MOSM 461 and MHIM 462 is presented in Microfiche Appendix A, which is incorporated herein by reference. MOSM 461 knows nothing about the hardware in host adapter 477 and communicates with both computer operating system 402 and MHIM 462. MHIM 462 communicates only with host adapter 477 and MOSM 461. MOSM 461 builds a SCB and sends the SCB to MHIM 462. Here, a SCB is one example of a hardware request block. One embodiment of the structure for a SCB is presented in TABLE 1.

TABLE 1

| Size | Description |
| --- | --- |
| 0. Byte | SCB command type |
| 1. Byte | SCB command status |
| 2. Byte | SCB Option flags |
| 3. Byte | Reserved = 0 |
| 4. Byte | SCB intermediate status |
| 5. Byte | Control register |
| 6. Byte | Target/Channel/LUN |
| 7. Byte | Number of Scatter/Gather segments |
| 8. Double Word | Pointer to Scatter/Gather list |
| 9. Double Word | Pointer to Command Descriptor Block (CDB) |
| 10. Byte | Length of Command Descriptor Block |
| 11. Byte | Reserved = 0 |
| 12. Byte | Host Adapter status |
| 13. Byte | Target status |
| 14. Double Word | Residual byte count |
| 15. 16 Bytes | Reserved Reserved Byte 8 Bit 3 = Aborted Flag Bit 2 = Abort SCB Flag Reserved Byte 10 = Aborted Host Adapter Status Byte |
| 15. 12 Bytes | SCSI Command Descriptor Block |
| 16. Double Word | Pointer to Sense Area |
| 17. Double Word | Sense Length |
| 18. Variable | Pointer to Next SCB in Array |
| 19. 8 Bytes | Work Area For Extended Messages |
| 20. Double Word | Pointer to custom data structures |

In Table 1, the first thirty-two bytes of the portion of the SCB between the two lines, i.e, entries 5 to 15, are transferred to storage location 443. The remaining three bytes in this portion of the SCB are supplied only to start the SCSI CDB on a double word boundary and so are not needed by host adapter 477. The other information in the SCB, i.e., entries 0 to 4 and 15 to 20, is used only by MOSM 461 and MHIM 462.

MOSM 461 and MHIM 462 have features that are not found in prior art OSM 204 and HIM 205. Herein, only the new features of MOSM 461 and MHIM 462 are described. The other features of MOSM 461 and MHIM 462 are similar to those described in copending and commonly assigned U.S. patent application Ser. No. 07/964,532 cited above for OSM 204 and HIM 205, respectively, and that description is incorporated herein by reference. Moreover, one embodiment of MOSM 461 and MHIM 462 is presented in Microfiche Appendix A and is incorporated herein by reference. Further, in view of the disclosure, those skilled in the art can modify a prior art host adapter driver to include the novel features of this invention.

Upon power-up and reset, MHIM 462 defines and initializes a plurality of structures in memory 470 and in scratch RAM 442. Both MHIM 462 and sequencer 420 can read and write to memory 470 and scratch RAM 442. However, MHIM 462 must pause sequencer 420 before accessing scratch RAM 442 and sequencer 420 accesses memory 470 using the DMA engine.

In this embodiment, MHIM 462 defines the structures listed in TABLE 2 in memory 470.

TABLE 2

STRUCTURES IN MEMORY EXTERNAL TO HOST ADAPTER THAT ARE DEFINED AND INITIALIZED BY HOST ADAPTER DRIVER

| Structure Name | Initialized To | Reference No. |
| --- | --- | --- |
| SCB array | Not Required | 472 |
| SCB address array | Not Required | 475 |
| Queue-in FIFO | Not Required | 476 |
| Queue-out FIFO | FFh | 478 |
| Busy Targets Table | FFh | 480 |

In this embodiment, MHIM 462 also defines and initializes the structures in scratch RAM 442 as listed in TABLE 3.

TABLE 3

STRUCTURES IN SEQUENCER INTERNAL MEMORY THAT ARE DEFINED AND INITIALIZED BY HOST ADAPTER DRIVER

| Structure Name | Offset in Scratch RAM | Initialized to | Reference No. |
| --- | --- | --- | --- |
| Active SCB Register | +28 | Not Required | 452 |
| SCB Address Array Register | +30 | Base Address of SCB Address Array 475 | 453 |
| Queue-in FIFO Counter | +34 | 00h | 450 |
| Queue-in FIFO Pointer Register | +35 | Base Address of Queue-in FIFO 476 | 457 |
| Queue-out FIFO Pointer Register | +55 | Base Address of Queue-out FIFO 478 | 458 |
| Busy targets table pointer register | +59 | Base Address of Busy Targets Table 480 | 456 |

Upon power-up, MHIM 462 defines and initializes structures in scratch RAM 442 for use only by sequencer 420, as presented in TABLE 4.

TABLE 4

STRUCTURES IN SEQUENCER INTERNAL MEMORY THAT ARE DEFINED AND INITIALIZED BY THE MHIM

| Structure Name | Offset in Scratch RAM | Initialized to | Reference No |
| --- | --- | --- | --- |
| Channel zero waiting SCB pointer register | +27 | Not Required | 454 |
| Channel one waiting SCB pointer register | +29 | Not Required | 455 |
| Next SCB array | +39 | 7Fh | 459 |

When MOSM 461 transmits a SCB to MHIM 462, MHIM 462 inserts the SCB at the end of singly linked SCB array 472 in memory 470. MHIM 462 uses an internal semaphore, that is kept within MHIM 462, to protect array operations and other operations that may be affected by re-entrancy. If there is no space in SCB array 472, MHIM 462 stores the SCB in another structure that is internal to MHIM 462 until space becomes available in SCB array 472.

To maintain SCB array 472, MHIM 462 uses Head_Of_Array pointer 464 and End_Of_Array pointer 465. Since maintenance of a singly linked array of objects using Head_Of_Array and End_Of_Array pointers 464, 465 is well-known to those skilled in the art, this aspect of the invention is not described further. The use of singly linked SCB array 472 is only an illustration of one embodiment of a SCB storage structure and so is not intended to limit the invention to this particular storage structure. An important aspect is that the SCB storage structure is large enough to hold a sufficient number of SCBs to prevent I/O bottlenecks.

Since MHIM 462 does not allocate SCBs, there is no limit imposed by MHIM 462 on the number of SCBs that can be sent to MHIM 462 by MOSM 461. However, in this embodiment, SCB array 472, which is the external SCB array for host adapter integrated circuit 477, has a maximum of 256 sites and each site is 32 bytes in size. However, only 255 sites are available for storage, because a pointer to site 256 is utilized as an invalid pointer. Those skilled in the art will appreciate that the number of sites is defined by the number of bits in the SCB pointer. Consequently, the particular size of the SCB pointer and consequently the size of SCB array 472 used herein are only illustrative of the principles of this invention are not intended to limit the invention to the sizes described herein.

SCBs 472A to 472N in SCB array 472 are not necessarily contiguous, i.e., the SCBs are not necessarily physically adjacent to each other, and may be physically scattered throughout memory 470. MHIM 462 maintains a SCB address array 475 that contains an entry, i.e., the physical base address in memory 470, for each of SCBs 472A to 472N in SCB array 472. This relationship is depicted in FIG. 4 by an arrow extending from an entry in SCB array address 475 to the base of a SCB in SCB array 472. Since each SCB is of the same size the base address is all that is required to access a SCB by sequencer 420. After linking a SCB into SCB array 472, MHIM 462 checks for an available entry in SCB address array 475.

If an available entry is found in SCB address array 475, the physical base address of the SCB newly added to SCB array 472 is calculated from the physical address of the CDB, i.e., the logical address of the SCB is converted to a physical address, and entered in SCB address array 475 at the first available location. In this embodiment, SCB address array 475 is a double ended stack where one end of the stack is used for tagged commands and the other end is used for non-tagged commands, e.g. non-tagged commands are stored in a stack that has pointer values ranging from 00 h to 07Eh and tagged commands are stored in a stack that has pointer values from FEh to 00 h. A low pointer is used for the non-tagged commands and a high pointer is used for the tagged commands. A check is made to assure that the low and high pointers do not collide. After MHIM 462 loads the physical base address of the SCB into SCB address array 475, the location within SCB address array, i.e., an offset from the base of SCB address array 475, is entered by MHIM 462 in a queue-in FIFO 476 within memory 470.

Physical base address 474 of SCB address array 475 is initialized in SCB address array register 453 by MHIM 462 at start-up (See Table 2). Thus, only offset 481, i.e., the location within SCB address array 475, from physical base address 474 of SCB address array 475 is required to address entry 482 in SCB address array 475.. Thus, each entry in queue-in FIFO 476 is referred to as a "SCB pointer,"

because an entry in queue-in FIFO 476 addresses a location in SCB address array 475 that contains the physical base address for a SCB in SCB array 472. Consequently, there is a one-to-one correspondence between a SCB pointer in queue-in FIFO 476 and a SCB in SCB array 472.

In this embodiment, valid SCB pointers in queue-in FIFO 476 have a value in the range from 00 h through FEh. However, non-tagged SCBs can only have SCB pointers in the range from 00 h through 7Eh. The non-tagged SCBs are assigned SCB pointers which lie within this range. The pointer value 7Fh is defined as the invalid pointer value for non-tagged SCBs. Bit 7 of the SCB pointer for a non-tagged SCB is used to indicate whether the corresponding SCB can be executed. When bit 7 is set, SCB execution can start. When bit 7 is reset, the corresponding SCB cannot be started yet or is not defined.

MHIM 462 maintains a rotating pointer to queue-in FIFO 476 and after a SCB pointer is stored in queue-in FIFO 476, the rotating pointer is incremented. Hence, all successive SCB pointers are loaded into successive locations of queue-in FIFO 476.

After the SCB pointer for a SCB is entered in queue-in FIFO 476, sequencer 420 is momentarily paused while MHIM 462 updates queue-in counter 450 in scratch RAM 442 of host adapter integrated circuit 477. In this embodiment, queue-in counter 450 is a one byte up-down counter. The value of queue-in counter 450 at any instant represents the number of SCB pointers stored in queue-in FIFO 476. This is the only pause of sequencer 420 that is required in normal operation.

When sequencer 420 is in an idle condition, sequencer 420 periodically checks queue-in counter 450 for a non-zero value. If queue-in counter 450 has a non-zero value, at least one location in queue-in FIFO 476 contains a SCB pointer. Therefore, sequencer 420 retrieves the location of the next SCB pointer in queue-in FIFO 476 from queue-in FIFO pointer register 457 in scratch RAM 442 and decrements queue-in counter 450. Specifically, a four byte physical memory address is maintained in scratch RAM 442 which points to a location within queue-in FIFO 476. Sequencer 420 retrieves the SCB pointer from queue-in FIFO 476 at this memory location using a DMA transfer.

After reading the SCB pointer from queue-in FIFO 476, sequencer 420 increments the physical memory address in queue-in FIFO pointer register 457. Hence, the physical memory address in queue-in FIFO pointer 457 always points to the next location of queue-in FIFO 476 to be read by sequencer 420. In this embodiment, only the low byte of the address stored in queue-in FIFO pointer 457 is incremented thereby providing an address rollover every 256 increments.

Assuming that the SCB corresponding to the SCB pointer retrieved from queue-in FIFO 476 can be executed immediately, the retrieved SCB pointer is stored by sequencer 420 in active SCB register 452 in scratch RAM 442. The SCB pointer in active SCB register 452 is valid only when SCSI interrupts to driver 403 are enabled. If a SCSI interrupt occurs, during execution of the SCB, the SCB pointer in register 452 identifies for MHIM 462 the active SCB when the interrupt occurred. Therefore, no searching is required to locate the appropriate SCB when a SCSI interrupt occurs.

Sequencer 420 adds the SCB pointer in active SCB register 452 to the physical base address in SCB address array register 453 to obtain a physical address for a location within SCB address structure 475. Sequencer 420 retrieves, via a DMA transfer, the physical base address for the SCB at that location within SCB address structure 475. Using the physical base address retrieved from SCB address array 475, sequencer 420 initiates a DMA process to transfer the SCB in SCB array 472 that starts at that address to the zeroth page, sometimes referred to as a slot, in internal SCB array 443, which is this embodiment is a hardware register. In this embodiment, as indicated above, 32 bytes of the SCB are transferred to internal SCB array 443. However, prior to the complete 32 byte transfer in a selection, the first two bytes of the SCB are transferred and examined to determine whether the SCB can be processed at this time. If the SCB can be processed, all 32 bytes are transferred and conversely.

Notice that although SCB array 472 can contain up to 256 SCBs at disjoint locations in memory 470, sequencer 420 did not search SCB array 472 to find the next SCB. Rather, the SCB pointer in queue-in FIFO 476 allowed sequencer 420 to directly retrieve the appropriate SCB. Therefore, the prior art sequential scans of the SCB array for a busy target have been eliminated in this situation. As described more completely below, the prior art sequential scans of the SCB array have been eliminated completely.

Hence, SCBs in SCB array 472 are initially loaded by MHIM 462 and may be modified by sequencer 420. However, no information is conveyed by sequencer 420 to MHIM 462 via SCB array 472. If MHIM 462 must access information in a SCB after execution has begun by sequencer 420, e.g., when a check_condition command is received, MHIM 462 must pause sequencer 420 and access the SCB at internal SCB register 443.

The above discussion assumed that the SCB corresponding to the SCB pointer retrieved from queue-in FIFO 476 could be executed directly. However, in fact, sequencer 420 performs a check to determine that the SCB can be executed, as explained more completely below. In performing the check, sequencer 420 utilizes a busy targets table 480 within memory 470. Busy targets table 480 stores SCB pointers, i.e., offsets for SCB address array 475, to non-tagged SCBs for which execution has been started, but has not yet completed. As explained more completely below, busy targets table 480 is used to locate within SCB array 472 the SCB for a reconnecting target. Busy targets table 480 is also used to indicate that a target/channel/LUN is already busy, and cannot accept another non-tagged command. Busy targets table 480 also can contain SCB pointers to tagged SCBs which have not completed.

In this embodiment, busy targets table 480 has 128 elements (entries) with each element representing a target/LUN address. Specifically, to support 16 targets having 8 LUNs per target, busy targets table must have 128 elements. Each element in busy targets table 480 is one byte in size and is referred to as the busy target byte.

Each entry in busy targets table 480 is associated with a target address. The location, e.g., offset in busy targets table 480 for a target address specified by a particular target/LUN combination, within busy targets table 480 is determined from a byte that is defined as given in Table 5.

TABLE 5

Bit Definition for Generating Offset for Target/LUN Combination in Busy Targets Table 480

| | |
|---|---|
| bit 7: | Channel Identification for Dual Channel Implementations |
| bits 6–4: | LUN |
| bits 3–0: | Target |

The numerical value of the byte defined in Table 5, specifies the storage location, i.e., offset, within busy targets table 480 for the SCB pointer to the SCB that utilizes that particular target/LUN combination. The target/LUN combination for a SCB is specified in a byte SCB_Tarlun of the SCB, i.e., item number six in Table 1. The format for byte SCB_Tarlun is given in Table 6.

TABLE 6

Bit Definition for Byte SCB_Tarlun in a SCB

| BIT | FUNCTION |
|-----|----------|
| 7 | SCSI Target ID |
| 6 | SCSI Target ID |
| 5 | SCSI Target ID |
| 4 | SCSI Target ID |
| 3 | CHANNEL |
| 2 | LUN |
| 1 | LUN |
| 0 | LUN |

Bits 4 to 7 in byte SCB Tarlun are a 4-bit field specifying the SCSI address of the particular target. For an 8-bit SCSI bus, the valid range for this SCSI ID field is from 0 to 7. For a 16-bit SCSI bus, the valid range is from 0 to 15.

The channel field, bit 3 within byte SCB_Tarlun, is a 1-bit field specifying the SCSI channel on which the target resides. If host adapter 477 is configured for dual SCSI channels and this bit is set to one, sequencer 420 attempts to execute the SCB on the secondary SCSI channel. Otherwise, the SCB is executed on the primary SCSI channel. If host adapter 477 is not configured for dual SCSI channels, bit 3 is always zero.

The LUN field is a 3-bit field specifying the Logical Unit Number of the target for which the SCB is to be executed.

In this embodiment, byte SCB_Tarlun in the SCB is rotated four bit positions to the left, as described below, to obtain the byte defined in Table 5, i.e., the target/LUN address. For example, assume that the SCB pointed to by SCB pointer 482 corresponds to SCSI target 1 and LUN 3, and so byte SCB_Tarlun has a binary value of "0001 0 011." Rotating byte SCB_Tarlun four bit positions to the left gives the binary value of 0 011 0001. The corresponding decimal value of the rotated byte SCB_Tarlun is 49. Thus, the forty-ninth entry in busy targets table 480 is set to SCB pointer 481. When sequencer 420 needs to find the SCB corresponding to target 1, LUN 3, sequencer 420 forms the byte as defined in Table 6 and then adds the offset, forty-nine, to the physical base address of busy targets table 480, that is stored in a busy table targets register 456 in memory 442, to obtain the location, i.e., physical address, of SCB pointer 481 in busy targets table 480. With this information, sequencer 420 fetches SCB pointer 481.

The formats in Tables 5 and 6 are only illustrative of the principles of this invention and are not intended to limit the invention to the particular bit definition sequences given. The important aspect is that the Target/Channel/LUN information is supplied in the SCB and this data is used to define a unique pointer into busy targets table 480.

While the SCB is active, a copy of its pointer is stored in active SCB register 452. The SCB pointer for a non-tagged SCB is kept in busy targets table 480 when waiting for a selection to complete. The SCB pointer for a non-tagged SCB is maintained in busy targets table 480 when the target disconnects from the SCSI bus and the SCB is written back to the proper location in SCB array 472. A pointer for a tagged command is not required to be stored on disconnect, since the pointer is used as the tag, but the SCB also is written back to the proper location in SCB array 472. Hence, when a tagged command reconnects, sequencer 420 receives the tag, and uses it to retrieve the SCB from memory 470.

Thus, busy targets table 480 provides a means for locating in memory 470 a SCB for a disconnected target without scanning SCB array 472. A SCB is located using the target and LUN associated with that SCB. Busy targets table 480 is also used to determine if a target is available to receive a new command. If a table element in busy targets table 480 contains a valid SCB pointer, the corresponding target/LUN is executing the SCB represented by that pointer. Conversely, if the table element contains an invalid SCB pointer, the target/LUN is either free or is executing a tagged SCB.

All busy targets table elements are initialized to an invalid SCB pointer value at power-up. See Table 2. When processing of a SCB is started, the entry in busy targets table 480, i.e., the entry in busy targets table 480 at the offset defined by to the rotation of byte SCB_Tarlun of the SCB, is loaded by sequencer 420 with the pointer to the SCB. Whenever execution of a SCB is completed or otherwise terminated, the entry in busy targets table 480 for the target/LUN combination of that SCB is loaded with an invalid SCB pointer by either sequencer 420 or MHIM 462. Herein, "otherwise terminated" means that SCB processing is no longer possible. This term does not include the periods when execution of an active SCB is suspended until a particular event occurs on the SCSI bus.

Once a SCB pointer is retrieved from queue-in FIFO 476, the SCB pointer is preferably not returned to FIFO 476 under any circumstance. If the SCB is non-tagged and cannot be started because the target/channel/LUN is already busy with a previous SCB, the newly retrieved SCB pointer is temporarily saved in a next SCB array 459 that is a 16-byte array in sequencer scratch RAM 442. Next SCB array 454 is used only by sequencer 420 and not by host adapter driver 403. Sequencer 420 stores the pointer in next SCB array 459 by target ID and channel number. The 16-byte size allows for a maximum of two non-tagged SCBs per target ID and channel. After the execution of the SCB using the target/channel/LUN is completed, the pointer for the SCB in next SCB array 454 requiring that target/channel/LUN is marked, i.e., bit 7 is set, to indicate that the SCB can now be executed. Sequencer 420, in the idle loop, scans next SCB array 454 prior to examining the value of queue-in counter 450 to obtain the next SCB for processing.

To facilitate locating a SCB pointer for a particular target/channel/LUN combination in next SCB array 454, SCB pointers are entered into next SCB array 454 at an offset defined in TABLE 7.

TABLE 7

Offset Definition for Storage of SCB Pointer in Next SCB Array

| Bit 3: | channel (narrow), or bit 3 of target address (wide) |
|--------|-----------------------------------------------------|
| Bits 2–0: | bits 2–0 of the target address |

In the definition of Table 7, wide SCSI requires four bits for the target address and so all four bits are used. Conversely, SCSI requires only three bits for the target address and so the fourth bit is used to select a channel for dual SCSI channel configurations.

After the execution of a SCB is complete, sequencer 420 loads the SCB pointer into a queue-out FIFO 478 in memory 470, and increments an address in a queue-out FIFO pointer register 458 so that when the next SCB is completed the appropriate location in queue-out FIFO 478 is addressed.

Specifically, sequencer 420 writes the SCB pointer to queue-out FIFO 478 using a DMA transfer. Sequencer 420 also generates a hardware interrupt for microprocessor 425. In this embodiment, the address in queue-out FIFO pointer register 458 is a four-byte physical address. Only the low address byte is incremented providing an address rollover every 256 increments because queue-out FIFO 478 is a one byte wide by 256 locations deep storage space in memory 370.

Upon receiving a command-complete interrupt from sequencer 420, MHIM 462 can read one or more pointers from queue-out FIFO 478. MHIM 462 maintains its own queue-out pointer to determine the address of a first valid pointer in queue-out FIFO 478 following a command-complete interrupt. However, MHIM 462 must determine the last valid pointer in queue-out FIFO 478, also. Hence, MHIM 462 has the capability to distinguish between a valid pointer and an invalid pointer. Alternatively, MHIM 462 could have been configured to determine the last valid pointer in queue-out FIFO 478 by pausing sequencer 420 and reading the address in internal queue out pointer register 458, but such a sequencer pause is undesirable and so this alternative was not implemented.

Initially, MHIM 462 initializes each entry in queue-out FIFO 478 to an invalid pointer, e.g., FFh. Sequencer 420 overwrites contiguous queue-out FIFO locations with valid pointers when one or more SCBs are completed, starting at the location given in queue-out FIFO pointer register 458. In response to the command-complete interrupt, MHIM 462 searches queue-out FIFO 478 at the address of the queue-out pointer maintained by MHIM 462 for a valid SCB pointer. If a valid SCB pointer is detected, the status of the SCB is updated and completion is posted to MOSM 461.

For normal completion, MHIM 462 overwrites the pointer to the completed SCB in queue-out FIFO 478 with an invalid pointer, e.g. FFh, and removes the corresponding address from SCB address array 475 to free up that location in SCB array 472 for use by another SCB. In another embodiment, sequencer 420 writes a null entry to queue-out FIFO 478 after a valid entry. Thus, in this embodiment, MHIM 462 does not need to write a null entry after reading an entry in queue-out FIFO 478. This resulted in greater system efficiency, since only sequencer 420 writes to queue-out FIFO 478 which resulted in fewer write cache flush operations.

MHIM 462 continues reading pointers from queue-out FIFO 478, processing the pointers as just described, and advancing the beginning pointer location after each read until an invalid pointer is detected. The particular value of the invalid pointer is illustrative only as are the other sizes used herein and are not intended to limit the invention to the particular sizes or values given. Here, an invalid pointer has been defined as the maximum array size, but other conventions could also be used.

When an exception completion condition (selection timeout, parity error etc.) occurs, i.e., the SCB is otherwise terminated, sequencer 420 is paused due to either a SCSI or sequencer interrupt. MHIM 462 obtains the index of the current SCB from active SCB register 452 in scratch RAM 442 and updates the SCB with the appropriate status. The SCB index is cleared from any tables where it may be found and appropriate locations are set to an invalid pointer. Sequencer 420 is restarted from the idle loop.

In the prior art, host adapter driver 203 preserved the order of SCB execution for a given target/channel/LUN by not allowing more than two non-tagged SCBs for the same target/channel/LUN, to be outstanding in the SCB array onboard host adapter integrated circuit 7770 at any given time. In one embodiment of this invention, no more than two non-tagged SCBs can be outstanding in SCB array 472 for the same target/channel at any given time.

Specifically, the default values and ranges to control SCB queuing by MHIM 462 are:

max_nontag_cmd=maximum number of active non-tagged SCBs per target ID. (Default is 2, other allowable value is 1)

max_tag_cmd=maximum number of active tagged SCBs per target ID. (Default is 32, can range from 1 to 32.)

max_total_cmd=maximum number of total SCBs outstanding in the sequencer. (Default and maximum is 255, may be physically limited to less than 255 by total memory size, the various tables require 12 bytes of RAM each for each active SCB allocated.)

Recall, that in the prior art technique, a sequential search of each element in the SCB array onboard the host adapter integrated circuit was performed in three situations. As described below, according to the principles of this invention, the appropriate SCB is located in these situations without scanning SCB array 472.

Process flow diagram 500 (FIG. 5) is an illustration of one embodiment of the processes of this invention used to locate a SCB without scanning SCB array 472. As explained above, at power-up in initialize table step 501, MHIM 462 sets each location in busy targets table 480 to a predetermined value, e.g., an invalid pointer. Upon completion of step 501, processing transfers to start SCB processing step 502.

In step 502, sequencer 420 retrieves a SCB pointer from one of queue-in FIFO 476 and next SCB array 459. Sequencer 420 cannot process a SCB having a target address for a target which is already executing a non-tagged SCB. Hence, prior to starting SCB execution, in target address busy step 503, sequencer 420 checks the entry in busy targets table 480 at the location corresponding to the target address of the SCB. Specifically, in this embodiment, sequencer 420 rotates byte SCB_Tarlun four positions to the left to obtain an offset in busy targets table 480. Sequencer 420 then adds the offset to the physical base address for busy targets table 480 retrieved from busy targets table register 456 to obtain a physical address for the location of the entry within busy targets table 480 that corresponds to the target address, e.g., the target/LUN combination, specified in the SCB.

If the entry contains an invalid SCB pointer, the target/LUN is available to receive a new command, and execution of the SCB is started by transferring from step 503 to update table step 506 where sequencer 420 overwrites the invalid SCB pointer with the SCB pointer for the SCB.

If the entry in busy targets table 480 contains a valid SCB pointer, sequencer 420 checks the SCB corresponding to that SCB pointer. If the SCB pointed to by the entry in busy targets table 480 is a tagged SCB, sequencer 420 starts execution of the new SCB by transferring processing from step 503 to step 506. The entry in busy targets table 480 is overwritten with the entry for the non-tagged command. In this embodiment, the same processing effort is used to write entries for tagged and untagged commands to busy targets table 480. However, since the information is not needed for tagged commands, it is simply overwritten.

Figure 5A:
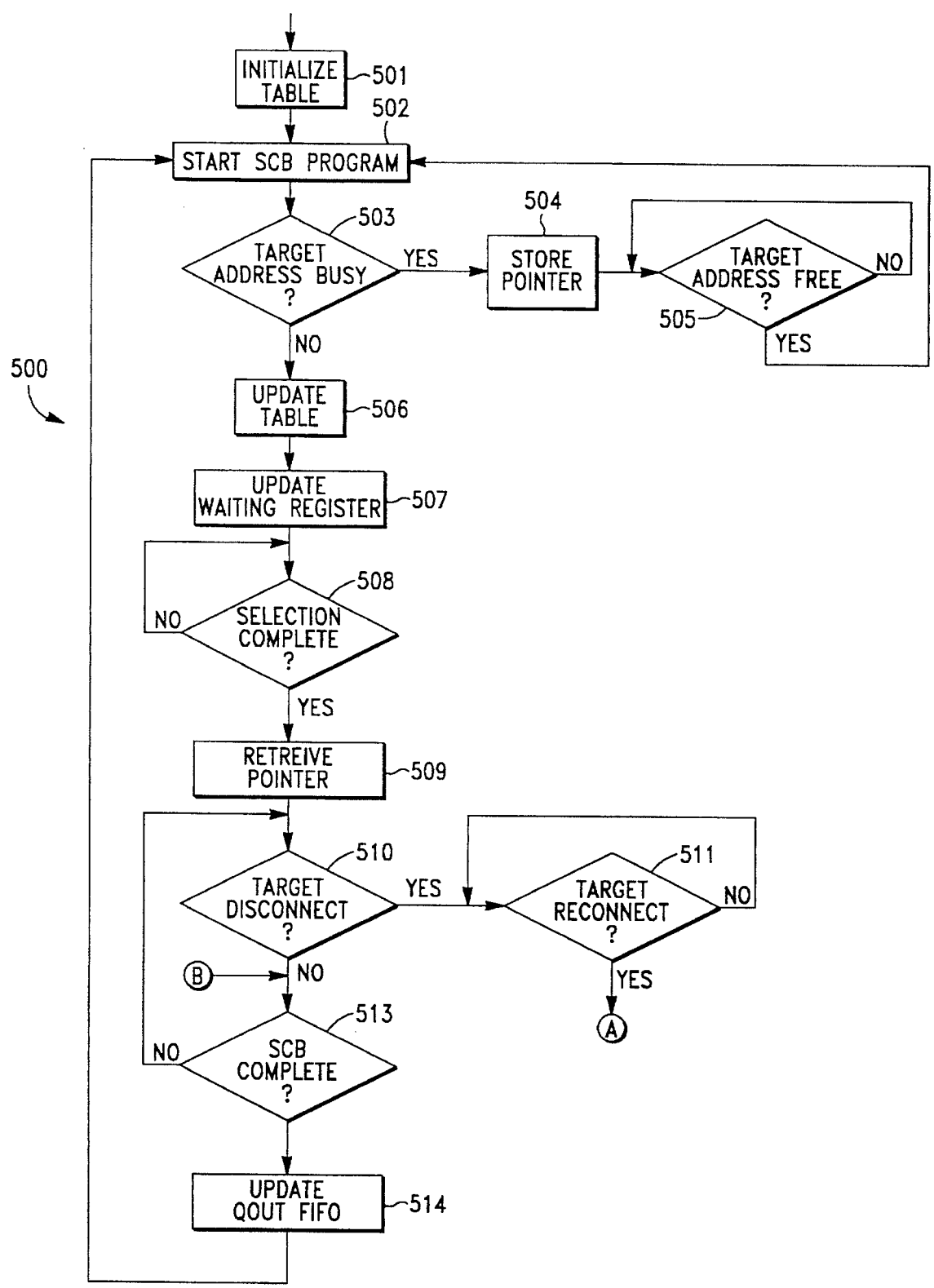
FIGS. 5A and 5B are a process flow diagram for retrieving SCBs without scanning the SCB array according to the principles of this invention.
Figure 5B:
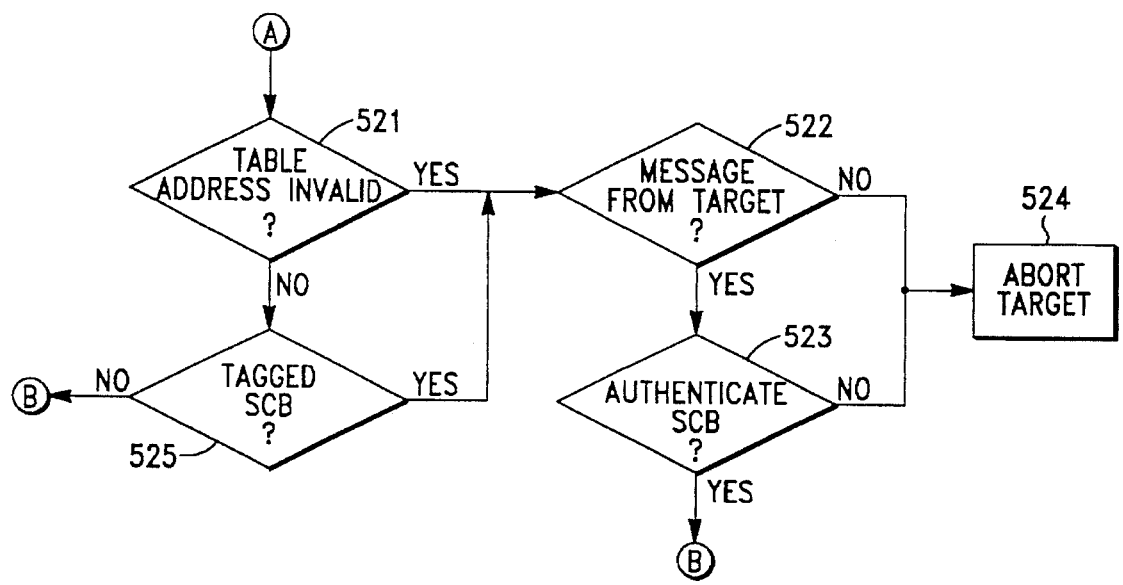

If the SCB pointed to by the entry in busy targets table 480 is neither a tagged SCB nor an invalid SCB pointer, the target/LUN is busy and sequencer 420 cannot start a new command to that target/LUN and so processing transfers from step 503 to store pointer step 504. In step 504, sequencer 420 postpones starting SCB execution by storing the SCB pointer in next SCB array 459. As explained above, when the executing SCB is completed or otherwise terminated, sequencer 420 marks the appropriate SCB in next SCB array 459 as ready for execution. The appropriate SCB is known because, as explained above, the SCB pointer are stored at a location within next SCB array 459 that corresponds to the channel and target ID of the SCB. In FIG. 5, processing is shown as branching from step 504 through target address free check 505, which corresponds to sequencer 420 marking a SCB in next SCB array 459 executable, to start SCB processing step 502.

Generally, SCSI protocol does not allow a mix of tagged and non-tagged commands to the same target/LUN. One notable exception is a non-tagged Request Sense Status command following a tagged command which completed with a Check Condition. To allow a non-tagged Request Sense Status command while tagged commands are outstanding, sequencer 420 allows a mix of tagged and non-tagged commands to the same target. It is the responsibility of driver 403 to conform to SCSI protocol.

As explained above, in step 506, a location in busy targets table 480, that corresponds to a particular target address, e.g., a particular target/LUN combination, is overwritten with the SCB pointer for the SCB specifying a command for that particular target address. Upon completion of step 506, in update SCB waiting channel step 507, sequencer 420 writes the SCB pointer in the appropriate one of registers 454 and 455. In this embodiment, only one selection operation is performed at a time.

Following the completion of a target selection, selection complete step 508 transfers processing to retrieve pointer step 509 in which sequencer 420 locates the corresponding SCB to the target selection. Depending on the SCSI channel used for the target selection, the pointer to the SCB that resulted in the target selection is stored either in SCB waiting to select channel zero register 454 or SCB waiting to select channel one register 455. The appropriate register is loaded with the SCB pointer when execution of the SCB started.

In one embodiment of this invention, the pointers in SCB waiting to select channel zero register 454 and SCB waiting to select channel one register 455 are only valid while a selection out is enabled for the corresponding SCSI channel. Sequencer 420 uses the SCB pointer in the appropriate one of SCB waiting to select channel zero register 454 and SCB waiting to select channel one register 455 following selection completion to locate the active SCB. Busy targets table 480 is not used in this case. The SCB pointer in the SCB waiting to select channel register is copied to active SCB register 452.

Following selection, the SCB continues executing unless there is a disconnection or the SCB is completed or otherwise terminated. Hence, in process 500 this is represented by target disconnect step 510 and SCB complete step 513. If a target disconnects, processing of the corresponding SCB transfers from step 510 to step 511, e.g., processing of the SCB is suspended and the SCB is written back to the SCB array until the target reconnects.

A reconnecting target provides the target address, which in this embodiment is the target/LUN combination identification as a signal sequence over the SCSI bus that is known to those skilled in the art. Sequencer 420 checks the entry in busy targets table 480 at the offset for the target/LUN combination specified by the reconnecting target. In this situation, the entry in busy targets table 480 can have one of three possible values, each of which are discussed below.

In step 521, sequencer 420 checks whether the entry in busy targets table 480 at the location corresponding to the target address, e.g., the target/LUN combination, is an invalid SCB pointer. If the entry is an invalid SCB pointer, the target must be reconnecting to a tagged SCB. Consequently, processing transfers from step 521 to step 522.

In step 522, sequencer 420 waits to receive a tagged message from the target which includes a pointer to the SCB that contained the command addressed to the reconnecting target. Upon receipt of the tagged message, processing transfers from target message step 522 to authentic SCB step 523.

In step 523, sequencer 420 authenticates the SCB pointed to by the target by confirming that the target/LUN in byte SCB_Tarlun of the SCB is the same as the target/LUN of the reconnecting target and by checking if a tagged command is enabled in the SCB. If the message is not received or the SCB cannot be authenticated, sequencer 420 directs host adaptor driver 403 to abort the target in step 524.

If the entry in busy targets table 480 is valid, processing transfers from step 521 to tagged SCB check 525. If the entry in busy targets table 480 is valid and the SCB pointer points to a non-tagged SCB, i.e., a SCB that does not have a tagged command enabled, the entry corresponds to the reconnecting target, and sequencer 420 is ready to resume its execution. Recall that the SCB pointer is retrieved from busy targets table 480 by sequencer 420 and added to the physical base address of SCB address table 475 to obtain the physical address for the location within SCB address table 475 that contains the physical base address of the SCB in SCB array 472. Thus, locating the appropriate SCB does not require any scanning but rather simple lookups in tables stored in memory 470. Processing transfers from step 525 to step 513 to resume the execution of the SCB.

Finally, if the entry in busy targets table 480 is a valid SCB pointer and the SCB pointer points to a tagged SCB, i.e., a SCB that has a tagged command enabled, processing transfers from step 525 to step 522. As described above, in step 522, sequencer 420 waits to receive a tagged message from the target which includes a pointer to the SCB that contained the command addressed to the reconnecting target. Upon receipt of the tagged message, processing transfers from target message step 522 to authentic SCB step 523.

In step 523, sequencer 420 again authenticates the SCB pointed to by the target by confirming that the target/LUN in the byte SCB_Tarlun of the SCB is the same as the target/LUN of the reconnecting target and by checking if a tagged command is enabled in the SCB. If the message is not received or the SCB cannot be authenticated, sequencer 420 directs host adapter driver 403 to abort the target in step 524.

There are many advantages in using SCB array 472 in place of the limited internal SCB array 243, disclosed in copending and commonly assigned U.S. patent application Ser. No. 07/964,532 cited above, having four hardware slots. For example, with the previously disclosed internal SCB array, SCBs were aborted by HIM 205 by pausing sequencer 220 and clearing 'swait' and 'sdiscon' bits in the control register of the SCB. In addition, internal queue-in FIFO 212 had to be searched serially to locate the pointer to the SCB. In contrast, aborting a SCB is now accomplished by MHIM 462 simply setting an 'aborted' bit, i.e., an aborted flag, in the SCB in SCB array 472. Bits swait and sdiscon are no longer used.

Since the 'aborted' bit is set when the SCB is in SCB array 472, sequencer 420 does not have to be paused and so the performance is enhanced. Further, MHIM 462 can set the flag at any time during SCB execution, and does not need to wait for sequencer 420 to be in the idle loop. Furthermore, MHIM 462 does not scan all entries in queue-in FIFO 476 to search for the pointer to the SCB.

Sequencer 420 checks the aborted flag after the pointer is popped out of queue-in FIFO 476, after selection has been completed, and after reconnection by a target. Upon detecting that the aborted flag is set, sequencer 420 attempts to abort the target by sending the target an abort message. If abortion is unsuccessful, SCB execution continues normally to completion.

Ordinarily, MHIM 462 does not participate in the actual abortion process, after setting the abort flag. MHIM 462 waits for an interrupt from sequencer 420 to indicate that SCB execution is complete and the target is no longer executing the command. The aborted flag is not overwritten when sequencer 420 returns the SCB to memory 470 following a disconnect message. If there is an error and sequencer 420 cannot find a SCB corresponding to a target, sequencer 420 interrupts driver 403 with an abort target interrupt code. Prior to sending an abort target interrupt code, sequencer 420 asserts the SCSI attention signal but does not assert the SCSI acknowledge signal.

Further, in addition to the more efficient abortion process which eliminates pausing sequencer 420 to set the aborted flag, the prior art host adapter integrated circuit 7770 with driver 203 limited the number of active SCBs to the number of onboard hardware registers and used a programmed I/O to transfer SCBs to and from the onboard hardware registers. In contrast, with SCB array 472, the number of active SCBs is only limited by the available RAM allocation.

When the internal SCB array was accessed via the previously disclosed serial "scanning" method, sequencer 220 needed to know the size of the array to terminate the scan. In contrast, when using the SCB pointer access method of this invention, sequencer 420 advantageously does not need to know the size of SCB array 472.

In the above discussion the processing of interrupts was referenced. In this embodiment, MOSM 461 is called by the operating system in response to a hardware interrupt from host adapter integrated circuit 477. MOSM 461 calls an interrupt handler in MHIM 462 which processes the interrupt. One embodiment of the interrupt handler is presented in Microfiche Appendix A.

FIG. 6 is a more detailed process flow diagram for one embodiment of the interrupt processing. In resources available check step 601, a byte is checked to determine whether there are possible re-entrancy problems. If there is a re-entrancy problem, processing simply returns to MOSM 461 via step 602. Conversely, if sufficient resources are available processing transfers from step 601 to valid interrupt or completed SCB step 603.

In step 603, MHIM 462 queries the interrupt status registers in host adapter integrated circuit 477 that were described in copending and commonly assigned U.S. patent application Ser. No. 07/964,532 cited above and that description is incorporated herein by reference. If the interrupt is neither a valid interrupt nor a completed SCB processing returns to step 602 which in turn transfers processing back to MOSM 461. Conversely if there is either a valid interrupt or a completed SCB, processing transfers from step 603 to command complete interrupt check step 604. Here a distinction is made between a completed SCB interrupt and other valid interrupts because a completed SCB interrupt does not pause sequencer 420, while the other valid interrupts do pause sequencer 420.

If processing of a SCB has been completed by sequencer 420, processing transfers from step 604 to process command complete interrupt 605. In this step, MHIM 462 checks the location in queue-out FIFO 478 pointed to by the queue-out FIFO pointer maintained by MHIM 462. If that location in the queue-out FIFO 478 contains a valid SCB pointer processing transfers from step 605 to step 606.

In step 606, the status of the completed SCB is updated and posted to MOSM 461 and the location in queue-out FIFO 478 is set to an invalid pointer and processing returns to command complete interrupt check step 604. As described above, processing cycles through steps 604, 605 and 606 until an invalid pointer is detected in queue-out FIFO 478 and then processing transfers to SCSI, sequencer, or breakpoint interrupt check step 607.

In step 607, if neither a SCSI, a sequencer, or a break point interrupt occurred, processing returns to valid interrupt or completed SCB check step 603 that was described above. Conversely, if step 607 detects any one of a SCSI, sequencer, or break point interrupt, processing transfers to process interrupt step 608.

Process interrupt step 608 responds to the sequencer, SCSI, or break point interrupt and then transfers processing to SCB completed or terminated step 609. Step 609 checks to determine whether the SCB was completed or terminated. If a SCB was neither complete nor terminated, i.e., a valid entry is not pointed to in queue-out FIFO 476, processing transfers from step 609 to valid interrupt or completed SCB step 603 which is described above.

If a SCB completed or was terminated, processing transfers to start next SCB and post completed SCBs step 610.

In step 610, the status of the completed SCB is updated and posted to MOSM 461 and the location in queue-out FIFO 478 is set to an invalid pointer and processing returns to step 603.

In the above embodiment, the SCB array access method used a busy targets table 480 in an external memory to quickly access a particular SCB without searching. However, the SCB array access method is not limited to a busy targets table 480 in an external memory. The SCB array access method also provided performance advantages for an array of SCBs that are stored within the host adapter integrated circuit. For example, busy targets table 480 can be a separate table that has an additional byte in each SCB in an onboard SCB array. In this case, the address of the SCB for a particular target/lun combination must be valid and can not change.

In yet another embodiment of the SCB array access method, a plurality of host adapter integrated circuits can share SCB array 472 with each host adapter integrated circuit allocated a fixed fraction of the slots in SCB array 472, e.g., for four host adapter integrated circuits, each integrated circuit could be assigned a quarter of the slots. Two options for using SCB array 472 and consequently busy targets table 480 with multiple host adapter integrated circuits include: restricting the multi-threading of LUNs for the same target, e.g., using target addresses only; or allocating two bytes per SCB in busy targets table 480.

Allocation of SCB array 472 is made by MHIM 462 as a function of the SCSI devices and possibly the type of application. MHIM 462 defines a base offset ARRAY_PARTITION into SCB array 472 and the size of array 472 allocated for host adapter integrated circuit. The pointer for busy targets table 480 generated from the target/LUN combination in a SCB is truncated according to the allocated size, and then added to the base offset to provide the absolute offset into busy targets table 480. The base offset value and allocated size are located within two sequencer firmware locations and are modified by MHIM 462 at load time.

When only one host adapter integrated circuit uses SCB array 472, constant ARRAY_PARTITION in the firmware of the host adapter integrated circuit is set to a default value of 00 h. Conversely, when four host adapter integrated circuits share SCB array 472, the respective constant ARRAY_PARTITION in the sequencer firmware of the four host adapter integrated circuits is set to 00 h, 40 h, 80 h, and C0 h, respectively.

MHIM 462 need not modify sequencer firmware instructions containing constant ARRAY_PARTITION when SCB array 472 is used by only host adapter integrated circuit 477. However, MHIM 462 needs to modify sequencer firmware instructions when multiple host adapter integrated circuits share SCB array 472.

Base offset ARRAY_PARTITION is added to the LUN/target address generated, i.e., the address generated from byte SCB_Tarlun in the SCB as described above, to create the pointer into busy targets table 480. When the number of partitions is greater than two, the pointer into busy targets table 480 must be adjusted to prevent it from illegally crossing over into the next partition. An adjustable mask byte 'target_LUN_mask' in the sequencer firmware is used for this purpose.

Mask byte target_LUN_mask is logically ANDed with the address generated from byte SCB_Tarlun in the SCB to select the bits for deriving the pointer into busy targets table 480. For example, when each host adapter integrated circuit sharing has a 128 site partition in busy targets table 480, all bits in the target/LUN address can be used to define the busy targets table pointer, and mask byte 'target_LUN_mask' is set to 7 Fh. However, for 64 site partitions, the LUN bits in the target/LUN address cannot be used in the derivation because the number of target/LUN combinations is greater than sixty-four. As such, the LUN bits must be masked out with mask byte 'target_LUN_mask' set to F0 h. Hence, in this embodiment, for partitions of less than 128 sites, MHIM 462 modifies sequencer firmware instructions containing constant 'target_LUN_mask' by setting the constant to F0 h at startup.

Figure 2:
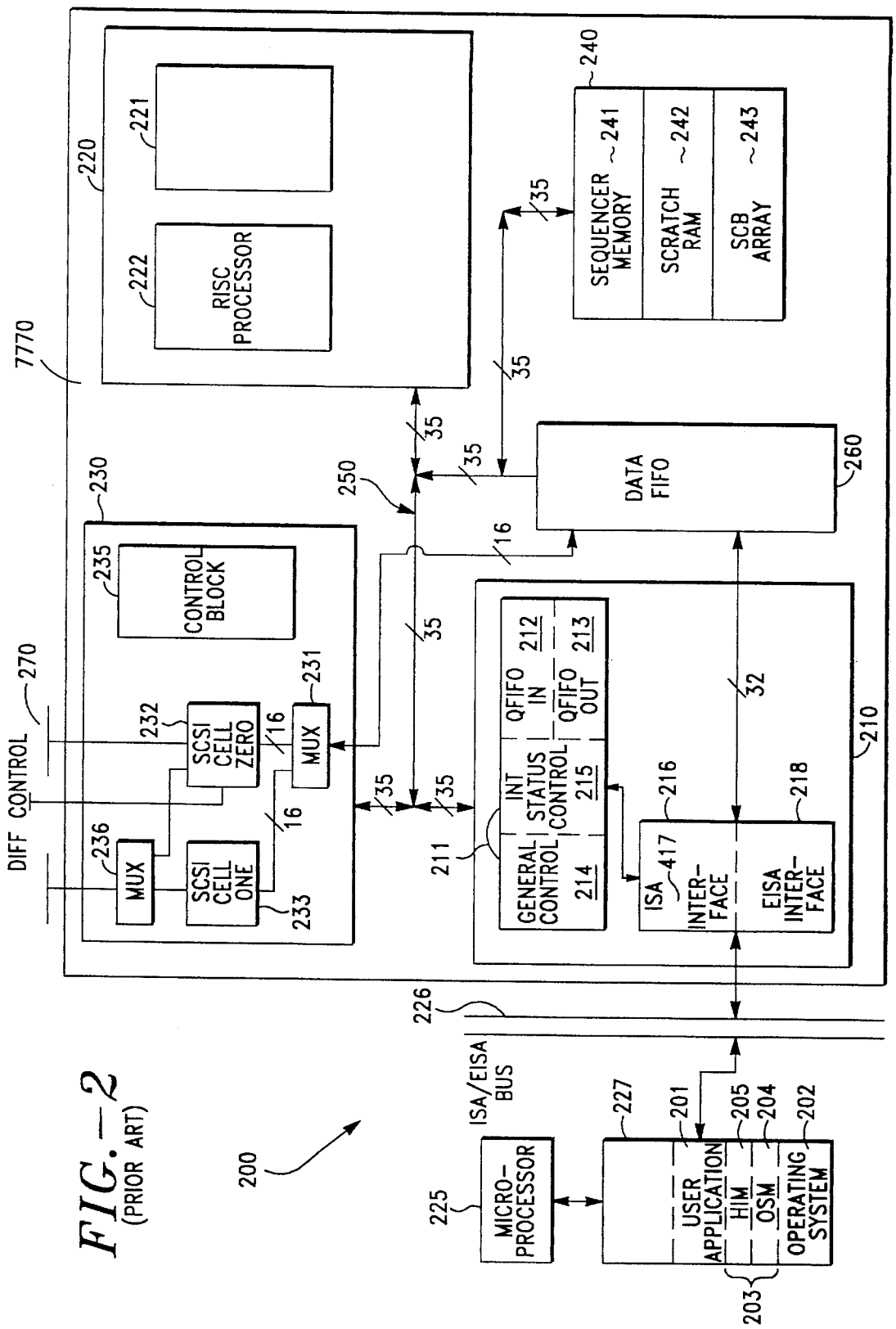
FIG. 2 is a block diagram of a prior art SCSI host adapter computer system that utilized a host adapter integrated circuit.
Figure 3:
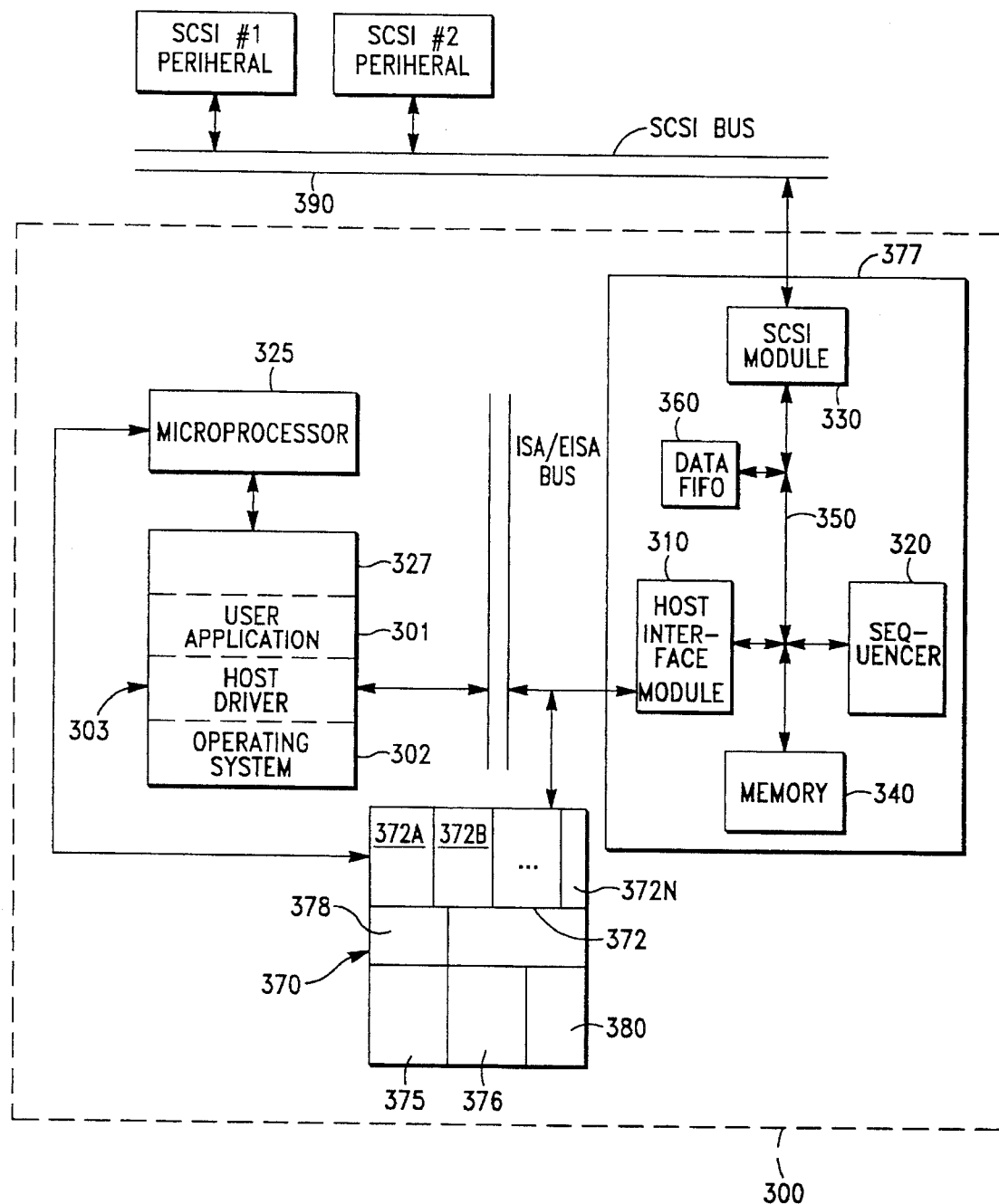
FIG. 3 is a block diagram of a SCSI host adapter computer system according to the principles of this invention that utilizes a memory external to a host adapter integrated circuit to eliminate I/O bottlenecks.

To demonstrate the enhanced performance of the external storage and the associated driver of this invention test results were performed using twenty clients on four Ethernet segments connected to a Zenith Z-Server 486/33 with the prior art host adapter system, as shown in FIG. 2, and with the host adapter system configuration shown in FIG. 3.

NetBench v2.1, a network-based benchmark suite that is intended to simulate the workload a server storage subsystem would support with active clients making repeated accesses to the server's disks was used. The twenty clients on the network transferred files to and from the server, and at the end of a specified period, each client reported the amount of data the client was able to read and write with the server.

Figure 7:
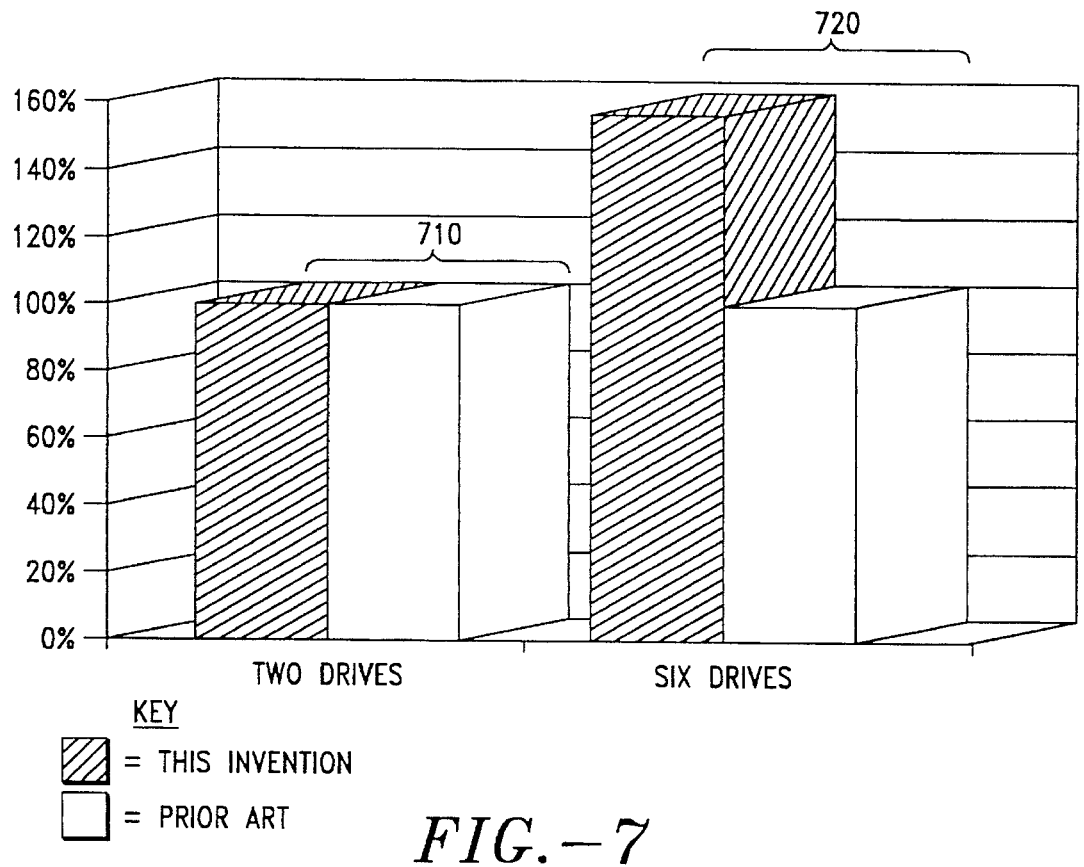
FIG. 7 is a graph that illustrates the enhancement in performance achieved with this invention.

FIG. 7 gives the results for two configurations, two disk drives 710, and six disk drives 720. With two disk drives, the performance of this invention is as robust as the prior art system. With six disk drives, the performance of this invention is 55% faster than the prior art system. In FIG. 7, the light bars represents the performance of the prior art system and the dark bars the performance of the system of this invention.

In another test, up to six DEC DSP3105 Fast SCSI hard disk drives were connected to the Zenith Z-Server 496/33 with the prior art host adapter system, as shown in FIG. 2, and with the host adapter system configuration shown in FIG. 3. NetFRAME DX v2.02 was used in this test. NetFRAME DX v2.02 is a benchmark routine that tests disk subsystems throughput by moving data back and forth between the server main memory and the storage subsystem. At the end of the specified period the volume of data transferred is measured in kilobytes per second.

Figure 8:
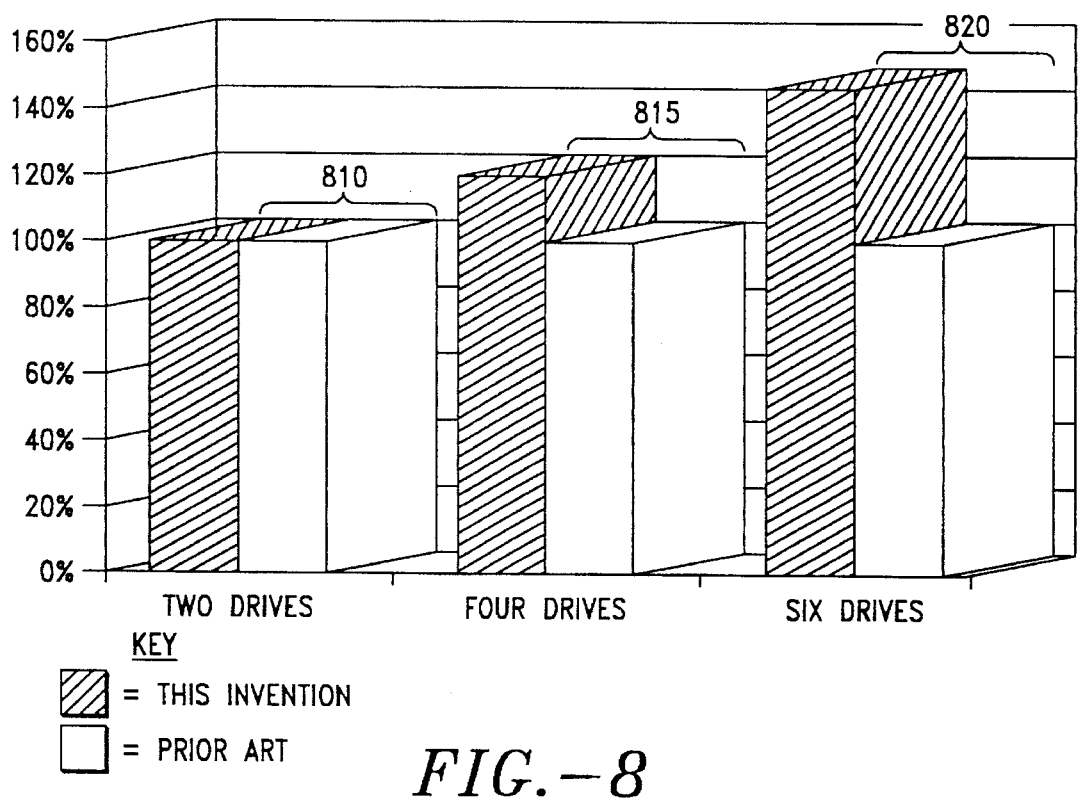
FIG. 8 is another graph that illustrates the enhancement in performance achieved with this invention.

FIG. 8 shows the results for the NetFRAME DX v2.02 performance comparison for two disk drives 810, four disk drives 815, and six drives 820. In FIG. 8, the light bars represent the prior art system and the dark bars the performance of the system of this invention. As illustrated in FIG. 8, this test also demonstrated that the host adapter system of this invention has a performance advantage over the prior art host adapter system. The present invention delivers 20% more throughput in four-drive setup 815 and an average of 45% more data in a six-drive configuration 820. A similar performance advantage was demonstrated for a UNIX environment.

This application is related to a copending commonly assigned and commonly filed U.S. patent application Ser. No. 08/269,491, entitled "A SCB ARRAY EXTERNAL TO A HOST ADAPTER INTEGRATED CIRCUIT" of Michael D. Brayton et al., filed on Jun. 30, 1994, which is incorporated herein by reference.

The above embodiments of this invention are illustrative only and are not intended to limit the invention to the particular embodiments described herein. In view of this disclosure, those skilled in the art can apply the principles of this invention to a wide variety of host adapters to obtain enhanced performance.

I claim:

1. A method of locating a hardware request block for a reconnecting target device on a SCSI bus comprising:

generating an offset using target address information provided by the reconnecting target device on said SCSI bus;

using said offset to locate a pointer stored in a table including pointers for busy target devices on said SCSI bus; and locating said hardware request block, using said pointer, for the reconnecting target device on said SCSI bus.

2. The method of claim 1 wherein said table including pointers for busy target devices on said SCSI bus is in a memory external to a SCSI host adapter integrated circuit.

3. The method of claim 1 wherein said table including pointers for busy target devices on said SCSI bus is in a memory within a SCSI host adapter integrated circuit.

4. The method of claim 1 wherein said target address information comprises target and logic unit number (LUN) information.

5. The method of claim 4 wherein said generating an offset further comprises rotating said target and LUN information.

6. The method of claim 5 wherein said target and LUN information is a hardware request block byte and further wherein said rotating said target and LUN information comprises rotating said hardware request block byte four bits to the left.

7. The method of claim 1 wherein said using said offset to locate a pointer stored in a table further comprises retrieving a physical base address for said table including pointers for busy target devices on said SCSI bus.

8. The method of claim 7 wherein said using said offset to locate a pointer stored in a table further comprises adding said offset to said physical base address for said table to obtain the location of said pointer in said table including pointers for busy target devices on said SCSI bus.

9. The method of claim 1 wherein said locating said hardware request block using said pointer further comprises using said pointer to locate a physical base address for said hardware request block for the reconnecting target device on said SCSI bus.

10. The method of claim 9 wherein said physical base address for said hardware request block is stored in a hardware request block address table.

11. The method of claim 10 wherein said using said pointer to locate a physical base address for said hardware request block further comprises retrieving a physical base address for said hardware request block address table.

12. The method of claim 11 wherein said using said pointer to locate a physical base address for said hardware request block further comprises adding said pointer to said physical base address for said hardware request block address table to obtain the location of said physical base address for hardware request block.

13. The method of claim 1 further comprising a first operation, prior to reconnection of said reconnecting target device on said SCSI bus, of using information in said hardware request block to generate said offset.

14. The method of claim 13 further comprising a second operation, prior to said reconnection of said reconnecting target device on said SCSI bus, of storing said pointer at a location in said table defined by said offset.

15. The method of claim 13 wherein said information in said hardware request block is target address information.

16. The method of claim 15 wherein said target address information includes target and LUN information.

17. The method of claim 16 wherein generating said offset in said first operation further comprises rotating said target and LUN information.

18. The method of claim 17 wherein said target and LUN information is in a hardware request block byte and further wherein said rotating said target and LUN information comprises rotating said hardware request block byte four bits to the left.

19. A method for monitoring availability of a SCSI target for use by a SCSI host adapter circuit comprising:

initializing a location, associated with a SCSI target address, in a table to a predetermined value to indicate that said SCSI target having said target address is available for use;

generating an offset for a location in said table using a target address in a SCSI hardware request block wherein said location at said offset is the location associated with said target address in said SCSI hardware request block; and writing a pointer to a storage location of an address of said SCSI hardware request block in said location at said offset only when said predetermined value is stored in said location at said offset to indicate availability of the SCSI target having said target address in said SCSI hardware request block.

20. A method for monitoring availability of a SCSI target for use by a SCSI host adapter circuit as in claim 19 wherein said target address in said SCSI hardware request block includes a target and LUN combination.

21. A method for monitoring availability of a SCSI target for use by a SCSI host adapter circuit as in claim 20 wherein generating an offset into said table using said target address comprises rotating said target and LUN combination.

22. The method of claim 21 wherein said target and LUN information is in a hardware request block byte and further wherein rotating said target and LUN combination comprises rotating said hardware request block byte four bits to the left.

* * * * *